US009455434B2

United States Patent
Geidl

(10) Patent No.: US 9,455,434 B2
(45) Date of Patent: Sep. 27, 2016

(54) DEVICE FOR DETECTING ELECTRICAL VOLTAGE

(71) Applicant: Samsung SDI Co., Ltd., Yongin-si, Gyeonggi-do (KR)

(72) Inventor: Uwe Geidl, Gratkorn (AT)

(73) Assignee: Samsung SDI Co., Ltd., Yongin-si (KR)

(*) Notice: Subject to any disclaimer, the term of this patent is extended or adjusted under 35 U.S.C. 154(b) by 248 days.

(21) Appl. No.: 14/168,256

(22) Filed: Jan. 30, 2014

(65) Prior Publication Data

US 2014/0212726 A1    Jul. 31, 2014

(30) Foreign Application Priority Data

Jan. 30, 2013   (DE) .................. 10 2013 201 556

(51) Int. Cl.
*H01M 2/20*    (2006.01)
*H01M 2/22*    (2006.01)

(52) U.S. Cl.
CPC ............. *H01M 2/204* (2013.01); *H01M 2/206* (2013.01); *H01M 2/22* (2013.01)

(58) Field of Classification Search
CPC ....... H01M 2/204; H01M 2/206; H01M 2/22
See application file for complete search history.

(56) References Cited

U.S. PATENT DOCUMENTS

| 2012/0015550 A1* | 1/2012 | Ikeda ................ H01M 2/1077 439/391 |
| 2012/0129024 A1* | 5/2012 | Marchio ............ H01M 2/1252 429/87 |
| 2012/0231640 A1* | 9/2012 | Ikeda ................ H01M 2/1061 439/110 |

FOREIGN PATENT DOCUMENTS

DE    10 2010 030 809 A1    1/2012

* cited by examiner

*Primary Examiner* — Brittany Raymond
(74) *Attorney, Agent, or Firm* — Lewis Roca Rothgerber Christie LLP

(57) ABSTRACT

A battery system having at least one contact element configured to provide a high level of mechanical stability. The battery system has a plurality of cells with cell poles, the electrical voltage of the cells configured to be tapped by the at least one contact element at the cell poles or at cell connectors that are connected to the cell poles in an electrically conductive manner. The contact element has a first contact element section and a second contact element section.

21 Claims, 4 Drawing Sheets

DEVICE FOR DETECTING ELECTRICAL VOLTAGE

CROSS-REFERENCE TO RELATED APPLICATIONS

The present application claims priority 35 U.S.C. §119 to German Patent Publication No. DE 10 2013 201 556.9 (filed on Jan. 30, 2013), which is hereby incorporated by reference in its entirety.

TECHNICAL FIELD

Embodiments relate to a battery system having at least one contact element configured to provide a high level of mechanical stability. The battery system has a plurality of cells with cell poles, the electrical voltage of the cells configured to be tapped by the at least one contact element at the cell poles or at cell connectors that are connected to the cell poles in an electrically conductive manner. The contact element has a first contact element section and a second contact element section.

BACKGROUND

German Patent Publication No. DE 10 2010 030 809 A1 discloses a connector that has at least two connecting sections comprising in each case different materials that are mixed with one another on the surfaces that lie against one another by way by way of example cold roll bonding. It does not disclose how a measuring line is attached and/or fastened to one of the connecting sections. The disadvantage is that a measuring line for tapping the respective cell voltages must be connected to a section of the connector in a complex and expensive process.

U.S. Patent Publication No. US 2012/0015550 A1 discloses a connector in which a crimped contact is embodied as one part with a connector. The crimped contact essentially has a base plate and two side walls having at least one pair of small press-in connecting plates that cut through the insulation of an electrical wire if the electrical wire is pressed into the crimped contact. Two crimped pieces are bent over in order to fix the electrical wire in the crimped section. The disadvantage of this solution is that the crimped section that is embodied as one piece with the connector is only connected to the connector by way of a small cross section region. In the case of vibrations such as those that may arise during operation in a motor vehicle, the connector may break at this transition point. Care must also be taken whilst handling the connector during the assembly process that the connector is not damaged prior to fastening the electrical wire of the connector.

SUMMARY

The disadvantages mentioned herein the conventional systems are resolved by way of the solution disclosed hereinafter.

Embodiments relate to a battery system having at least one contact element configured to provide a high level of mechanical stability. The battery system also includes a plurality of cells and a plurality of cell poles. The electrical voltage of the cells are configured to being tapped by way of the contact element at the cell poles, or at cell connectors that are connected to the cell poles in an electrically conductive manner. The contact element has a first contact element section and a second contact element section.

Embodiments relate to a battery system having at least one contact element, the battery system having a plurality of cells having cell poles. The electrical voltage of the cells are configured to being tapped by way of the contact element at the cell poles or at cell connectors that are connected to the cell poles in an electrically conductive manner. The contact element has a first contact element section and a second contact element section that are connected to one another in an electrically conductive manner. The first contact element section is composed of the same material as the cell connector or the cell pole, while the second contact element section is composed of a second material that is different than the first material. The first contact element section is also connected to one of the cell poles or to one of the cell connectors in an electrically conductive and bonded manner. The second contact element section has at least one stop that lies at least in sections on and/or over a front end face of the first contact element section and extends to become at least one reinforcing rib. The bending and torsional rigidity is increased as a result of raising the second contact element section by way of the stop and the at least one extended reinforcing rib. This advantageously results in a reduced susceptibility to damage of the entire component in the case of mechanical loading.

The contact element includes two sections and is, by way of example, connected to the cell connector in an electrically conductive manner. The contact element is connected by way of a first contact element section to the cell connector mechanically by way of, for example, welding. The first contact element section is also composed of the identical material as the cell connector.

The first contact element section and the second contact element section of the contact element may be connected to one another in an electrically conductive manner by way of roll bonding, ultrasonic welding, resistance welding, TOX-clinching, clinching, folding or laser welding, in particular in a gas-tight and positive locking manner.

In accordance with embodiments, the second contact element section of the contact element is composed of a material that is different than the material of the first contact element section. In this regard, the first contact element section may be composed of a metal such as aluminium or an aluminium alloy, and the second contact element section may be composed of a metal such as copper or a copper alloy.

The second contact element section is connected to the first contact element section of the contact element by way of roll bonding in a permanent, electrically conductive manner. Ultrasonic welding or resistance welding may also be used as an alternative to roll bonding for connecting the two sections of the contact element. If the first contact element section and/or the second contact element section of the contact element are composed of the identical or similar basic material as the elements that are to be connected to the respective sections, corrosion, and therefore, a reduction of the electrical conductivity between these components is prevented as a result of the identical standard potential in the electrochemical electromotive series.

In the case of roll bonding, a sheet is rolled on to the base material under the influence of pressure and heat. This creates by way of diffusion and pressure welding a connection that cannot be detached. As a consequence, corrosion between the two surfaces is prevented and therefore the service life of the contact element and also the transition resistance, in particular in the case of a contact element that has already been in use over a long period of time, is essentially reduced and the functional reliability is ensured over a longer period of time.

The following methods in particular may be used for the roll bonding. Overlay coating: in this case, the entire surface of a carrier strip is coated. Inlay coating: in this case, strip-shaped inlays embodied from base or noble metals are embedded in the carrier basic material. Onlay coating: in this case, thin strip-shaped contact basic materials are applied in plate form directly on to the carrier strip.

In accordance with embodiments, the second contact element section of the contact element may alternatively be composed of the identical material as the first contact element section. In this regard, the sections of the contact element may be composed of a metal such as copper or a copper alloy. The two sections may be connected in this case by way of resistance welding.

Since the second contact element section of the contact element may be embodied as a thin sheet, having a thickness of a few tenths of a millimetre. The thin sheet may be connected to the first contact element section of the contact element using roll bonding or by way of ultrasonic or resistance welding.

A crimped section may be provided and which may be connected as one part to the at least one reinforcing rib and to the stop as an extension of the second contact element section of the contact element. The crimped section may be embodied as an end region of the extension of the second contact element section after the reinforcing ribs. Since the crimped contact is embodied as one part with the second contact element section, an additional joining process may be dispensed with and consequently the level of complexity and costs may be reduced. In accordance with embodiments, the crimped section may be produced using the identical material as the second contact element section.

A crimping process may be used to connect a conductor to a connecting element, since this connection ensures a high electrical and mechanical reliability, and therefore, may be preferred to a soldered or welded connection. During the crimping process, the connection is achieved by way of a plastic deformation, by way of example, of two components. An electrically insulated measuring line is inserted into the crimped section, in which during the crimping process, the electrical insulation is cut through as the measuring line is pressed into the crimped section by way that are provided in the crimped section and thus the electrical connection is established.

Alternatively, however, it is possible to provide a measuring line that has been stripped of insulation in the region of the crimped section. In this case, the crimped section only comprises means for a plastic deformation, by way example, of two components for holding the measuring line.

In accordance with embodiments, the stop may be embodied to the left and right of the extension of the second contact element section, in which the extension extends away from the joining zone of the first and second contact element section of the contact element. The stop transitions at least on the left-hand side or on the right-hand side into a reinforcing rib of the extension, such as, for example, to the left and to the right of the stop. Left and right of the extension of the second contact element section may be understood to mean an arrangement of the stop on both sides of the extension.

The stop of the second contact element section is only so high that it does not protrude beyond the upper edge of the first contact element section. As a consequence, a secure clamping arrangement of the contact element to, by way of example, a plate is ensured. At least one clip for in each case one contact element is provided on and/or over the plate and the contact element may be clamped in to the clip to enable precise positioning with a respective cell pole or cell connector of the battery system in accordance with embodiments.

The second contact element section may include at least one stop in accordance with embodiments in a region of the joining zone. The stop may lay at least in regions on a front surface of the first contact element section. As a consequence, the stop of the second contact element section renders possible a defined positioning for the first contact element section in a second plane. The connection of the first contact element section to the second contact element section is rendered possible with an enhanced level of accuracy. The first plane is defined byway the joining zone of the first and second contact element section and is spatially arranged essentially perpendicular to the second plane.

In accordance with embodiments, an additional stop may be provided on and/or over the second contact element section, and spatially arranged parallel to a second front end face of the first contact element section to the stop. In this way, the second contact element section of the contact element is also delimited on and/or over a second front end face of the first contact element section by way the additional stop. Since the second contact element section now lies in x-, y- and z-plane on and/or over the second contact element section, its position is secured.

The measuring line may be connected to the crimped section in a permanent, electrically conductive manner. The measuring line is connected to an electronic unit that evaluates the voltage potential that is tapped by the contact element.

In accordance with embodiments, a battery system may include at least one of the following: a plurality of cells each having cell poles; a cell connector to connect the cell poles to each other in an electrically conductive manner; and a contact element configured to permit tapping of the electrical voltage of the cells at one of the cell poles and at cell connectors, the contact element having a first contact element section connected at one region thereof to one of the cell pole and the cell connectors in an electrically conductive manner, and at a second region thereof to a second contact element section having at least one stop that lies at least in sections on a front end face of the first contact element section and extends to become at least one reinforcing rib, wherein the first contact element section and the second contact element section are connected to one another in an electrically conductive manner.

In accordance with embodiments, a battery system may include at least one of the following: a plurality of cells each having cell poles; a cell connector to connect adjacent cell poles to each other in an electrically conductive manner; a first contact element section arranged over a respective cell and connected to one of the cell pole and the cell connectors in an electrically conductive manner; and a second contact element section arranged over a respective cell, connected to the first contact element section in an electrically conductive manner, and having a stop connected to the first contact element section, at least one reinforcing rib extending from the stop, and a crimped section extending from the reinforcing rib.

DRAWINGS

Embodiments will be illustrated by way of example in the drawings and explained in the description below:

DESCRIPTION

Figure 1:
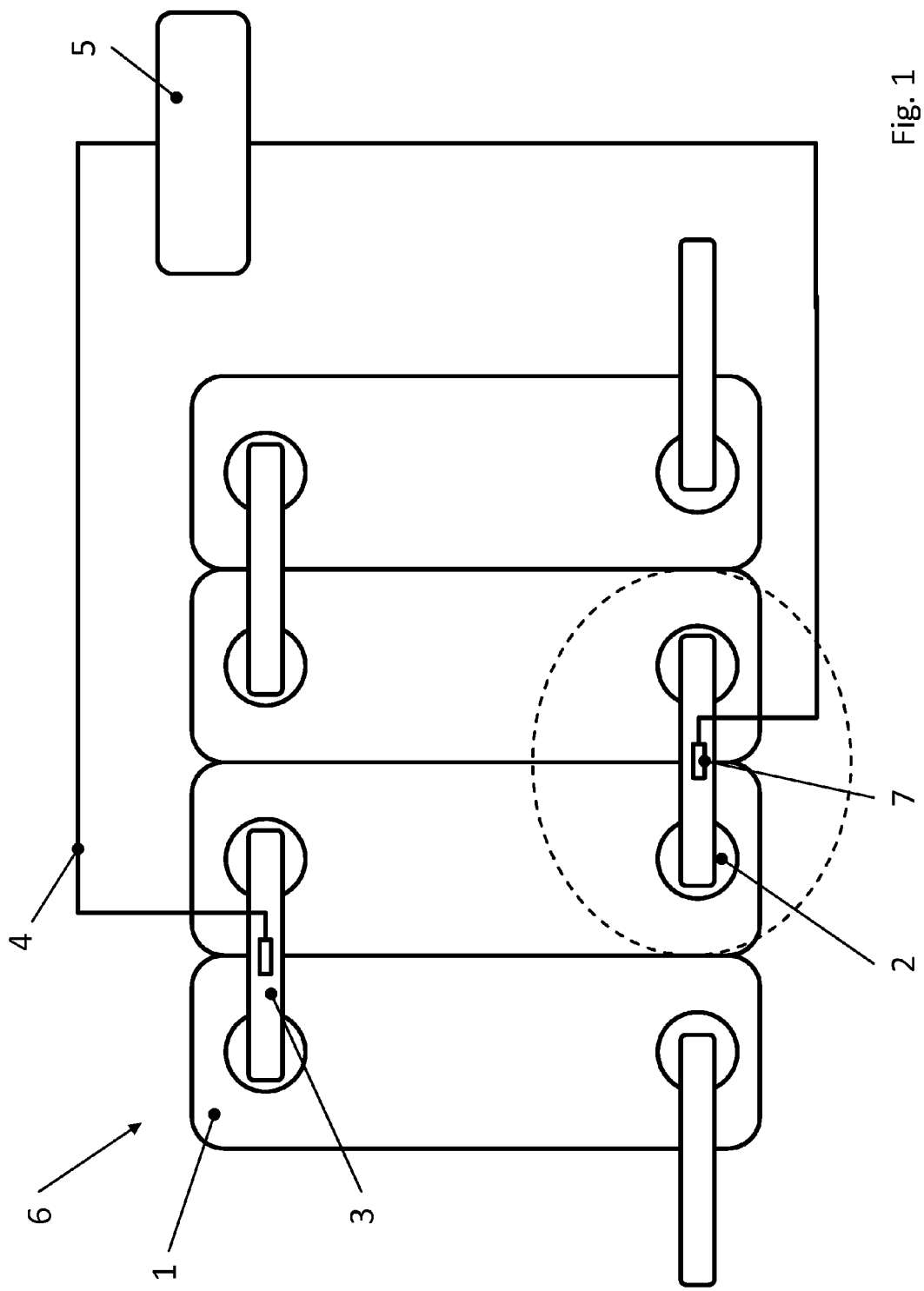
FIG. 1 illustrates a plan view of a battery system having a contact element, in accordance with embodiments.

A battery system 6 having a plurality of cells 1 is schematically illustrated in FIG. 1. The cells 1 each include essentially a base surface, a covering surface and four side surfaces. Cell poles 2 protrude from the covering surface of each respective cell 1, and are connected to one another in series by way cell connectors 3. The cell connectors 3 connect in each case a positive pole of a cell 1 to a negative pole of another cell 1, such as, for example, an immediately adjacent cell 1. Contact elements 7 are arranged on and/or over the cell connectors 3, and render possible a voltage tapping arrangement. The contact elements 7 are connected to measuring lines 4 that are, in turn, connected to an electronic unit 5. The measuring lines 4 transfer the voltage of the cells 1 that is prevailing at the contact elements 7 to the electronic unit 5 that correspondingly evaluates the data. The measuring lines 4 are connected in an electrical manner to the contact elements 7 by way of crimped sections 11 that are embodied as one part with the contact elements 7.

Figure 2:
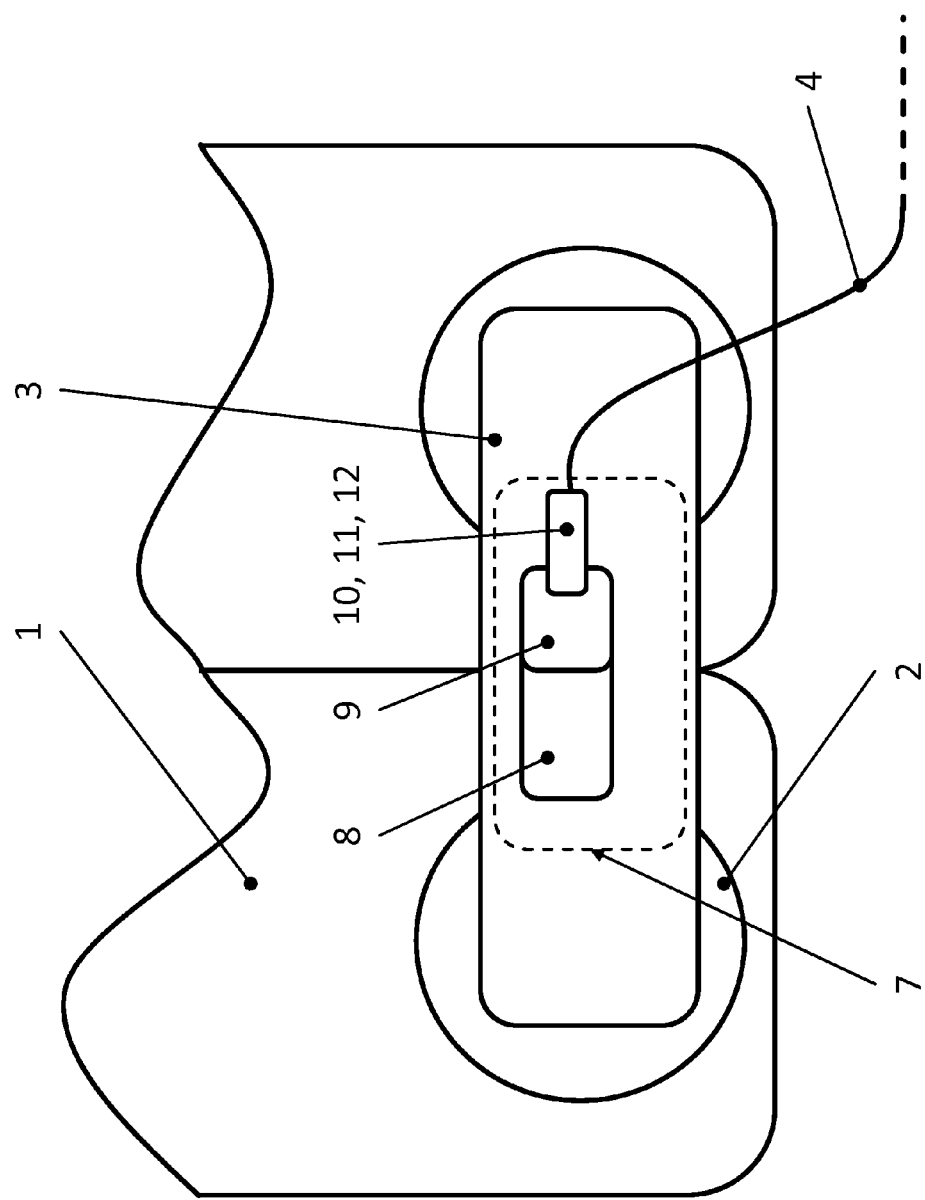
FIG. 2 illustrates a connecting arrangement of FIG. 1.

FIG. 2 illustrates a connecting arrangement of immediately adjacent cell poles 2 in FIG. 1. The contact element 7 has a first contact element section 8 and a second contact element section 9. A crimped section 11 is connected as one part to the second contact element section 9 of the contact element 7. The contact element 7 is connected by way of the first contact element section 8 in an electrically conductive manner to a cell connector 3, by way which a cell pole 2 of a cell 1 is connected to an additional cell pole 2 of a neighbouring cell 1. The connection may be bonded, such as, for example, by way welding.

The cell connector 3 and the first contact element section 8 of the contact element 7 may be composed of a first material, such as, for example, a metal such as one of aluminium, an aluminium alloy, copper or a copper alloy. The second contact element section 9 and the measuring line 4 may be produced using a second material, such as, for example, a metal such as copper.

The first contact element section 8 and the second contact element section 9 may be connected to one another in an electrically conductive manner, by way of example, by way roll bonding, ultrasonic welding or resistance welding. The second contact element section 9 of the contact element 7 may include an extension that has reinforcing ribs 10 that extend away from a stop 12 and a crimped section 11 that is embodied as one part with the second contact element section 9 of the contact element 7.

The measuring line 4 may have an electrically insulating layer that covers the copper wire. The electrically insulating layer may be penetrated by way of the crimped section 11, by way of example sharp small plates, during connection of the measuring line 4 to the contact element 7. As a consequence, an electrically conductive connection is produced between the measuring line 4 and the contact element 7.

Figure 3:
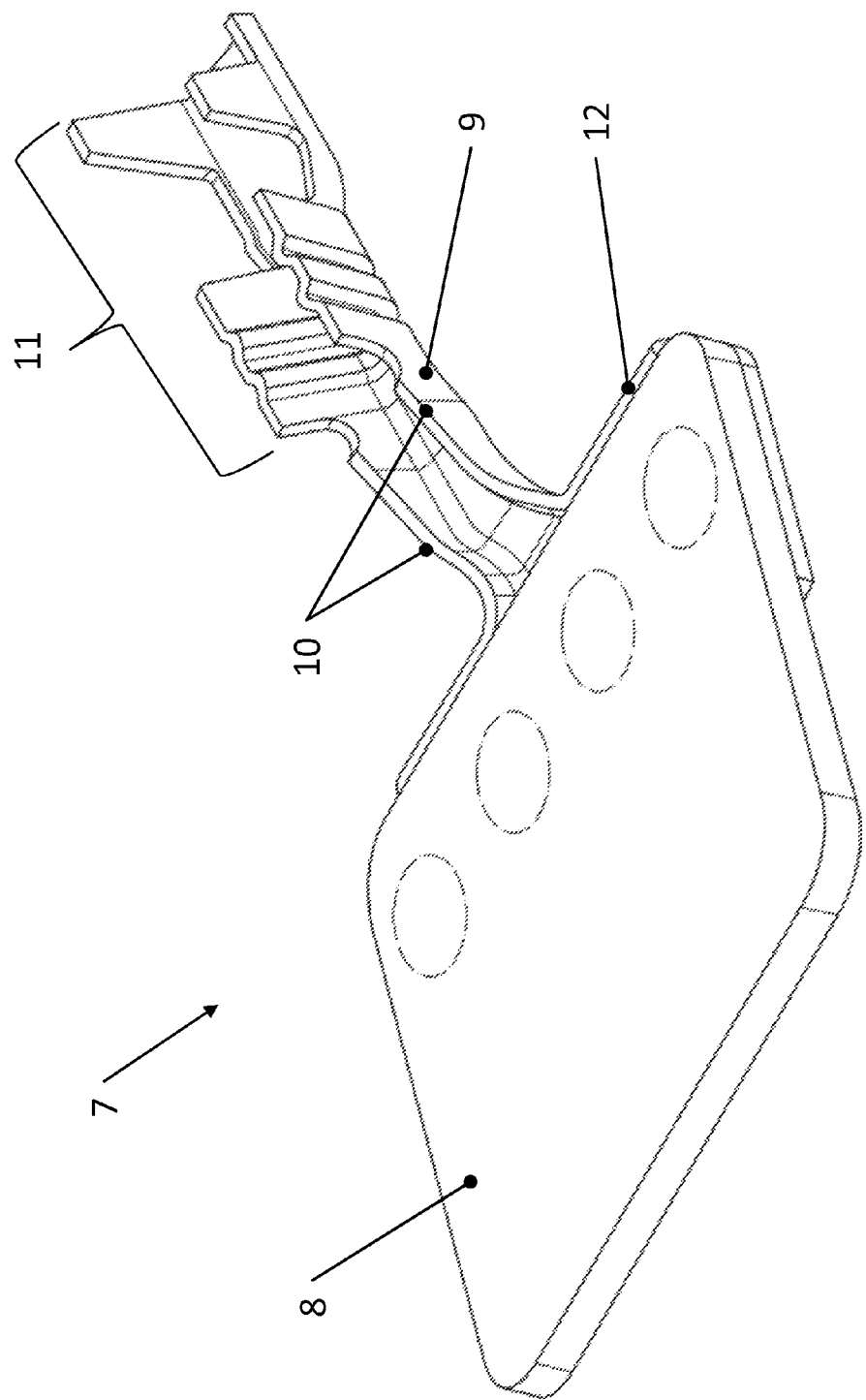
FIG. 3 illustrates a perspective view of a contact element in accordance with embodiments.

FIG. 3 illustrates the contact element 7 in a perspective view and includes the first contact element section 8 and the second contact element section 9. The second contact element section 9 may be permanently connected to the first contact element section 8 by way of roll bonding, ultrasonic welding or resistance welding. The crimped section 11 that is illustrated in FIGS. 3 and 4 may be embodied for fastening a measuring line 4 that is stripped of insulation in the region of the crimped section and does not include a device or mechanism for penetrating insulation.

Figure 4:
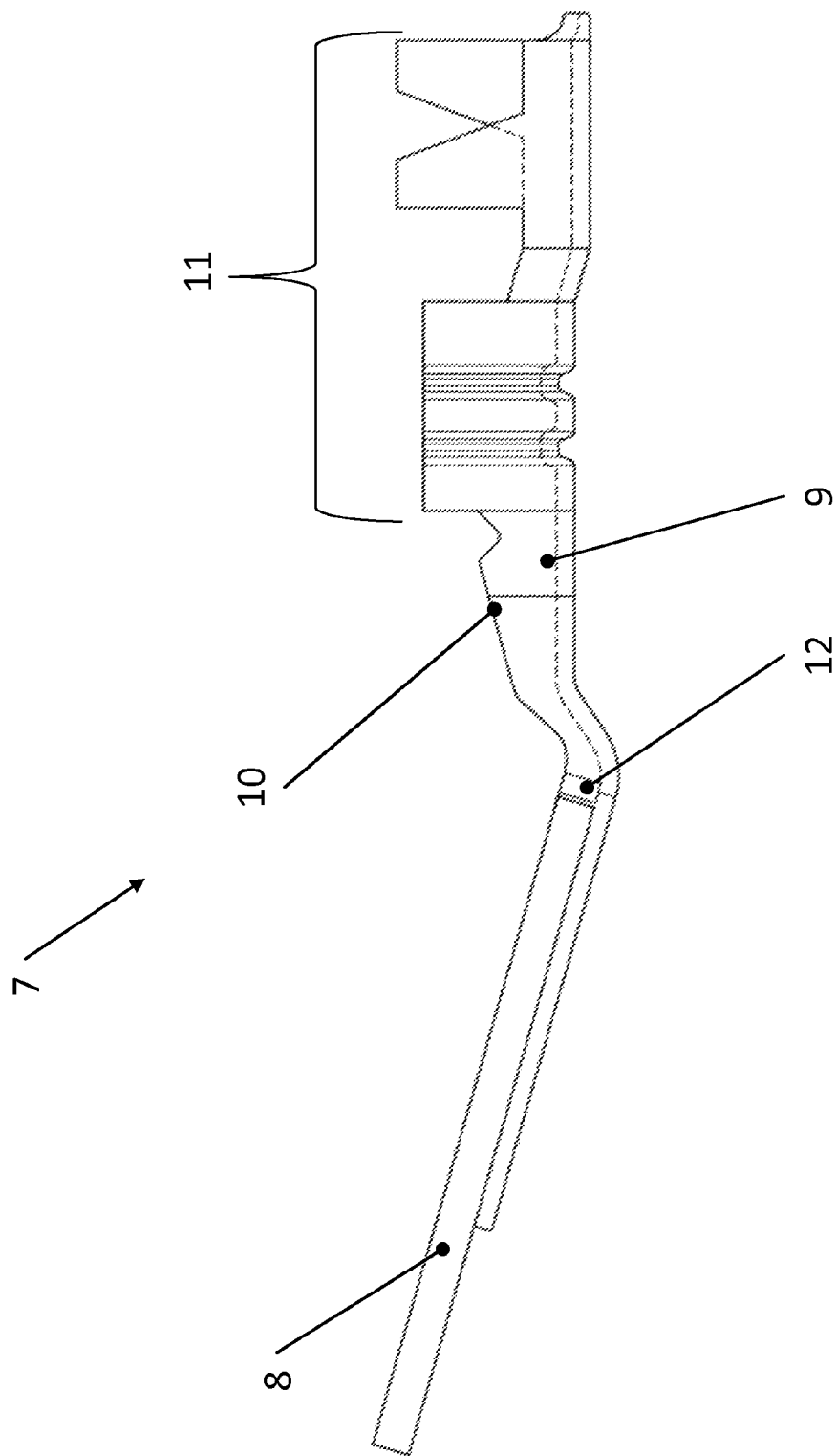
FIG. 4 illustrates a side view of a contact element of FIG. 3.

FIG. 4 illustrates a side view of the contact element 7 in accordance with FIG. 3. The second contact element section 9 has at least one stop 12, the stop 12 having s thickness such that it does not protrude over the upper edge of a front end face of the first contact element section 8. Extending from the stop 12 in the direction of the crimped section 11 are reinforcing ribs 10. The stop 12 and the reinforcing ribs 10 are configured to structurally reinforce the second contact element section 9 whereby the bending and torsional rigidity of the second contact element section 9 is considerably increased.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Cell
2 Cell Pole
3 Cell Connector
4 Measuring Line
5 Electronic Unit
6 Battery System
7 Contact Element
8 First contact element section
9 Second contact element section
10 Reinforcing Rib
11 Crimped Section
12 Stop

What is claimed is:

1. A battery system comprising:
a plurality of cells each having cell poles;
a cell connector electrically connecting respective ones of the cell poles to each other;
a first contact element electrically connected to the cell connector and the respective ones of the cell poles, the first contact element being configured to permit tapping of the electrical voltage of the cells at the respective ones of the cell poles and the cell connector; and
a second contact element electrically and physically connected to the first contact element, the second contact element comprising:
a stop contacting the first contact element, the stop being configured to restrict rotation between the first contact element and the second contact element; and
a reinforcing rib extending from the stop.

2. The battery system of claim 1, wherein the first contact element and the second contact element are connected to each other by roll bonding, ultrasonic welding, resistance welding, TOX-clinching, clinching, folding or laser welding.

3. The battery system of claim 1, wherein:
the first contact element is composed of a first material; and
the second contact element is composed of a second material that is different than the first material.

4. The battery system of claim 3, wherein the first material and the second material each comprise a metal.

5. The battery system of claim 4, wherein:
the first material comprises aluminium or an aluminium alloy; and
the second material comprises copper or a copper alloy.

6. The battery system of claim 1, wherein:
the first contact element is composed of a first material; and
the second contact element is composed of a second material that is the same as the first material.

7. The battery system of claim 6, wherein the first material and the second material each comprise a metal.

8. The battery system of claim 6, wherein the first material and the second material each comprise copper or a copper alloy.

9. The battery system of claim 1, wherein a material of the first contact element is the same as a material of at least one of the cell connector and the cell pole.

10. The battery system of claim 1, further comprising a measuring line connected to the second contact element.

11. The battery system of claim 1, wherein the stop and the second contact element are integrally formed.

12. A battery system comprising:
a first cell and a second cell each comprising a first cell pole and a second cell pole;
a cell connector electrically connecting the first cell pole of the first cell to the second cell pole of the second cell, the first cell pole of the first cell and the second cell pole of the second cell being adjacent to each other;
a first contact element over the first cell and electrically connected to the first cell pole of the first cell and the cell connector; and
a second contact element over the second cell and electrically and physically connected to the first contact element, the second contact element comprising:
a stop contacting the first contact element;
a reinforcing rib extending from the stop; and
a crimped section extending from the reinforcing rib.

13. The battery system of claim 12, wherein the first contact element and the second contact element are connected to each other by roll bonding, ultrasonic welding, resistance welding, TOX-clinching, clinching, folding or laser welding.

14. The battery system of claim 12, wherein:
the first contact element is composed of a first material; and
the second contact element is composed of a second material that is different than the first material.

15. The battery system of claim 14, wherein the first material and the second material each comprise a metal.

16. The battery system of claim 15, wherein:
the first material comprises aluminium or an aluminium alloy; and
the second material comprises copper or a copper alloy.

17. The battery system of claim 12, wherein:
the first contact element is composed of a first material; and
the second contact element is composed of a second material that is the same as the first material.

18. The battery system of claim 17, wherein the first material and the second material each comprise a metal.

19. The battery system of claim 17, wherein the first material and the second material each comprise copper or a copper alloy.

20. The battery system of claim 12, wherein a material of the first contact element is the same as a material of one of the cell connector and the first cell pole.

21. The battery system of claim 12, further comprising a measuring line connected to the crimped section.

* * * * *